United States Patent
Cort et al.

(10) Patent No.: US 10,145,511 B2
(45) Date of Patent: Dec. 4, 2018

(54) GAS FILLING APPARATUS AND METHOD

(71) Applicant: INTELLIGENT ENERGY LIMITED, Loughborough (GB)

(72) Inventors: Colin Cort, Loughborough (GB); Colin Bennett, Loughborough (GB); Christopher Conlon, Loughborough (GB); Simon Payne, Loughborough (GB); Monjur Choudhury, Loughborough (GB); Hiten Mistry, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 126 days.

(21) Appl. No.: 14/910,630

(22) PCT Filed: Aug. 6, 2014

(86) PCT No.: PCT/GB2014/052417
§ 371 (c)(1),
(2) Date: Feb. 5, 2016

(87) PCT Pub. No.: WO2015/019094
PCT Pub. Date: Feb. 12, 2015

(65) Prior Publication Data
US 2016/0195219 A1    Jul. 7, 2016

(30) Foreign Application Priority Data
Aug. 8, 2013  (GB) .................................. 1314228.6

(51) Int. Cl.
*F17C 5/06* (2006.01)
*F17C 11/00* (2006.01)

(52) U.S. Cl.
CPC .............. *F17C 5/06* (2013.01); *F17C 11/005* (2013.01); *F17C 2221/012* (2013.01);
(Continued)

(58) Field of Classification Search
CPC .... F17C 5/06; F17C 11/05; F17C 2223/0123; F17C 2225/0123; F17C 2227/043
(Continued)

(56) References Cited

U.S. PATENT DOCUMENTS

| 4,249,654 A | 2/1981 | Helversen |
| 6,135,170 A | 10/2000 | Lee et al. |

(Continued)

FOREIGN PATENT DOCUMENTS

| CN | 1107834 C | 5/2003 |
| CN | 102575808 A | 7/2012 |

(Continued)

OTHER PUBLICATIONS

International Patent Application No. PCT/GB2014/052417; Int'l Search Report; dated Mar. 9, 2016; 9 pages.

*Primary Examiner* — Timothy L Maust
(74) *Attorney, Agent, or Firm* — Baker & Hostetler LLP

(57) ABSTRACT

A gas filling apparatus for filling a plurality of gas storage vessels with a gas, the apparatus comprising a plurality of gas filling ports, each port configured to introduce gas into one of the gas storage vessels, and a controller configured to supply gas to the gas filling ports for filling the vessels and to control the supply of gas to all of the gas filling ports based on a property of any one of the vessels.

17 Claims, 4 Drawing Sheets

(52) U.S. Cl.
CPC ............... *F17C 2223/0123* (2013.01); *F17C 2225/0123* (2013.01); *F17C 2227/0348* (2013.01); *F17C 2227/043* (2013.01); *F17C 2250/0439* (2013.01); *F17C 2250/0626* (2013.01); *F17C 2260/022* (2013.01); *F17C 2270/0168* (2013.01); *F17C 2270/0184* (2013.01); *Y02E 60/321* (2013.01)

(58) Field of Classification Search
USPC ............................................ 141/20, 234–237
See application file for complete search history.

(56) References Cited

U.S. PATENT DOCUMENTS

| | | | |
|---|---|---|---|
| 6,182,713 B1* | 2/2001 | Deck .................. | B01F 3/026 141/104 |
| 6,378,601 B1 | 4/2002 | Ovshinsky et al. | |
| 6,786,245 B1* | 9/2004 | Eichelberger ............ | B60S 5/02 141/18 |
| 7,128,103 B2* | 10/2006 | Mitlitsky .......... | H01M 8/04089 141/197 |
| 7,568,507 B2* | 8/2009 | Farese .................. | F17C 5/06 141/197 |
| 7,987,877 B2* | 8/2011 | Bavarian .................. | F17C 7/00 137/255 |
| 8,156,970 B2* | 4/2012 | Farese .................... | F17C 5/007 141/197 |
| 8,281,820 B2* | 10/2012 | White ..................... | F17C 5/02 141/37 |
| 8,418,732 B2* | 4/2013 | Cohen .................. | G05D 11/132 141/107 |
| 8,899,278 B2* | 12/2014 | Cohen ..................... | F17C 7/02 141/104 |
| 2001/0039803 A1 | 11/2001 | Iida et al. | |
| 2003/0192779 A1* | 10/2003 | Cheng .................. | C01B 3/0005 204/266 |
| 2006/0168999 A1 | 8/2006 | Fisher | |
| 2007/0068576 A1 | 3/2007 | Fisher et al. | |
| 2009/0127137 A1 | 5/2009 | Golz et al. | |
| 2009/0293988 A1* | 12/2009 | Pang ......................... | F17C 5/06 141/59 |
| 2010/0059138 A1* | 3/2010 | Shi ........................... | F17C 5/06 141/5 |
| 2010/0213084 A1 | 8/2010 | Hirose | |
| 2012/0205003 A1 | 8/2012 | Okawachi | |
| 2016/0245459 A1* | 8/2016 | Grimmer .................. | F17C 5/06 |

FOREIGN PATENT DOCUMENTS

| | | |
|---|---|---|
| DE | 19859654 A1 | 6/2000 |
| DE | 102004012477 A1 | 10/2004 |
| DE | 69934923 T2 | 8/2007 |
| DE | 112006002110 T5 | 7/2009 |
| EP | 0188996 A2 | 7/1986 |
| EP | 0933583 A2 | 8/1999 |
| JP | S60-060399 A | 4/1985 |
| JP | 2001-208296 A | 8/2001 |
| JP | 2002-106792 A | 4/2002 |
| JP | 2004-084808 A | 3/2004 |
| TW | 463023 B | 11/2001 |
| TW | 496941 B | 8/2002 |
| TW | 509769 B | 11/2002 |
| TW | 528849 B | 4/2003 |
| WO | WO 2000/036333 A1 | 6/2000 |
| WO | WO 2001/081850 A1 | 11/2001 |
| WO | WO 2002/061249 A1 | 8/2002 |
| WO | WO 2007/072470 A1 | 6/2007 |
| WO | WO 2007/124825 A1 | 11/2007 |

\* cited by examiner

GAS FILLING APPARATUS AND METHOD

CROSS-REFERENCE TO RELATED APPLICATIONS

This application is a National Stage of International Patent Application No. PCT/GB2014/052417, filed Aug. 6, 2014, and claims priority to foreign application GB 1314228.6, filed Aug. 8, 2013, the contents of which are incorporated herein by reference in their entirety.

This invention relates to a gas filling apparatus and method for introducing a gas, such as a gaseous fuel, into a plurality of gas storage vessels. In particular, it relates to a hydrogen filling method and associated apparatus for introducing hydrogen into a plurality of fuel storage vessels for use in a fuel cell system. The invention also relates to a hydrogen storage vessel.

BACKGROUND

Metal hydrides can be used to store hydrogen gas. Metal hydrides can absorb gaseous hydrogen and chemically store it. Thus, a metal gas storage material, which may be in a crystalline form, can be hydrolyzed by absorbing hydrogen to form a metal hydride. The term "metal hydride" will be used to refer to this example gas storage material in its varying states of hydrolization. The reaction is reversible and thus the hydrogen can be released when required. Typical metal hydrides suitable for storage of hydrogen include sodium hydride, aluminium hydride or lithium hydride. For efficient absorption of hydrogen the metal hydride can be "activated" by repeatedly presenting gaseous hydrogen to the metal hydride at elevated pressure. Once activated, in which the hydride may adopt a crystalline form, hydrogen may be presented to the hydride at an elevated pressure such that it is absorbed by the hydride and chemically stored in its structure. Thus, metal hydrides and other gas storage materials can be used in gas storage vessels to store gas, such as hydrogen for use by fuel cells. The absorption of hydrogen by the metal hydride is a reversible reaction and therefore the hydrogen gas can be extracted from the gas storage vessels when required.

It is desirable to reuse the gas storage vessels once the gas stored therein has been used. Thus, an efficient system for filling the gas storage vessels with a gas would be advantageous. The absorption of a gas by a gas storage material needs to be carefully controlled to ensure that vessel contains a consistent quantity of gas.

DISCLOSURE

According to a first aspect of the invention we provide a gas filling apparatus for filling a plurality of gas storage vessels with a gas, the apparatus comprising a plurality of gas filling ports, each port configured to introduce gas into one of the gas storage vessels, and a controller configured to supply gas to the gas filling ports for filling the vessels and to control the supply of gas to all of the gas filling ports based on a property of any one of the vessels.

The apparatus may provide an efficient means for filling a plurality of gas storage vessels simultaneously. The apparatus may operate in a batch process manner. The controller is advantageous as it can control the supply of gas to compensate for the plurality of vessels filling at different rates. Thus, for example, if one of the vessels is absorbing the gas at a high rate and thus becomes hot, the supply of gas to all of the vessels is controlled to allow the one hot vessel to cool. This provides an efficient means for safely and reliably filling a plurality of gas storage vessels simultaneously to a consistent level. The controller can react if any one (or more than one) of the vessels is not filling in accordance with a desired filling profile due to changes in its temperature, for example.

The gas storage vessels may be of the type that include a gas storage material that absorbs the gas supplied by the gas filling apparatus. The apparatus may comprise a hydrogen filling apparatus for filling hydrogen storage vessels for use in a fuel cell system.

The term filling is intended to cover introducing fuel to the vessels whether or not the full capacity of a vessel or the vessels is reached. Thus, "filling" does not necessarily mean filling until full, but filling a desired level.

The gas filling ports may extend from a common manifold which is adapted to be supplied with gas. This is advantageous as the controller can control the gas supplied to the manifold in order to control the gas supplied to all of the gas filling ports.

The apparatus may include a plurality of vessel sensors, each sensor configured to be associated with one of the gas storage vessels. The sensors may be temperature sensors. Each sensor may be arranged to measure the temperature of its associated vessel. The temperature of the vessel may be indicative of the rate at which the gas storage material is absorbing the gas. The sensors may be arranged to measure the temperature of a housing of the vessel or they may be located in or adjacent to the filling ports. Alternatively, the sensors may form part of the vessels. Thus, the apparatus may be configured to receive a temperature reading from each of the vessels whether this be from a sensor of the apparatus or a sensor of the vessel.

The controller may be configured to progressively increase the pressure of the gas supplied to the vessels. The rate at which the gas pressure is increased may be linear or of another profile.

The controller may be configured to control the supply of gas to the vessels in the event the temperature of any one of the plurality of vessels exceeds a predetermined threshold. This is advantageous as the controller can adjust the pressure of the gas to control the reaction rate and therefore the temperature of the vessels.

The controller may be configured, in the event the temperature of any one of the plurality of vessels exceeds a predetermined threshold, to halt the progressive increase gas pressure supplied to the vessels for a pause period. Halting the progressive increase of the gas pressure by temporarily maintaining the pressure at a constant amount or by decreasing the rate of pressure increase or by decreasing the pressure is advantageous as it will slow the reaction rate of the gas storage material absorbing the gas. This will reduce the heat generated in the vessel allowing it to cool. The careful control of vessel temperature is important to achieve a consistent fill amount. The controller may stop further gas entering the apparatus to maintain the pressure. It will be appreciated that the gas pressure may decrease during the pause period as the gas storage material absorbs the gas. Alternatively, the controller may monitor the pressure and adjust a pressure control valve to maintain a constant pressure.

The controller may be configured to resume progressively increasing the pressure after the pause period. The pause period may be determined by the time it takes for the vessel that exceeded the threshold to cool to a temperature below the threshold by a predetermined amount. The predetermined amount may be zero or may be a non-zero number of degrees Celsius below the threshold temperature. For example, the predetermined amount may be 3° C.

The controller may be configured to progressively increase the pressure until a predetermined hold pressure is reached at which point the controller is configured to maintain the pressure for a hold period. This is advantageous as the provision of a hold period at a hold pressure gives the gas storage material in the vessels time to absorb the desired quantity of gas for a reliable and consistent fill quantity.

The apparatus may include a temperature regulation device for regulating the temperature of the vessels. The temperature regulation device may comprise a water bath adapted to receive the plurality of gas storage vessels. The apparatus may include a water bath temperature sensor for use in controlling the temperature of the water bath. Thus, the apparatus may use the temperature regulation device to try and maintain a constant temperature for the vessels and the control of the gas pressure is used when the temperature regulation device cannot successfully regulate the temperature of one or more of the vessels.

The controller may be configured to supply gas at a common pressure to each of the plurality of gas filling ports.

The controller may be configured to independently control the supply of gas to the plurality of gas filling ports in order to reduce or shut off the supply of gas to one or more of the plurality of gas filling ports, whilst maintaining the supply of gas to the remaining ones of the plurality of gas filling ports. The controller may be configured to reduce or shut off the supply of gas to the one or more of the plurality of gas filling ports in the event the temperature of an associated gas storage vessel exceeds a predetermined threshold.

According to a second aspect of the invention we provide a gas filling method comprising the steps of;
receiving a plurality of gas storage vessels;
supplying gas to said gas storage vessels;
determining a property of each of said gas storage vessels;
controlling the supply of gas to the plurality of gas storage vessels based on the determined property of any one of the gas storage vessels.

The method provides an advantageous way of simultaneously filling a plurality of gas storage vessels.

The property may comprise the rate at which gas is being absorbed into each of the vessels. The rate at which gas is being absorbed may be determined by measuring the temperature of each of the vessels.

The method may include progressively increasing the pressure at which gas is supplied to the vessels. The method may include the step of, on determining that the measured property exceeds a predetermined threshold, halting the progressive increase of pressure at which gas is supplied to the vessels for a pause period.

The pause period may comprise a period in which the measured property falls below the predetermined threshold by a predetermined amount. Alternatively, it may be a predetermined period of time.

The step of supplying gas may include a ramp phase and a hold phase, the ramp phase comprising progressively increasing the pressure at which gas is supplied to the vessels and the hold phase comprising maintaining the pressure at which gas is supplied to the vessels for a hold period. The ramp phase may end and the hold phase may begin when a predetermined hold pressure is reached. The hold period may comprise a predetermined period of time.

The vessels may be received within a water bath and the method may include measuring and controlling the temperature of the water bath.

The method may comprise controlling the supply of gas to provide gas at a common pressure to each of the plurality of gas filling ports.

The method may comprise independently controlling the supply of gas to the plurality of gas filling ports in order to reduce or shut off the supply of gas to one or more of the plurality of gas filling ports, whilst maintaining the supply of gas to the remaining ones of the plurality of gas filling ports. The method may comprise reducing or shutting off the supply of gas to the one or more of the plurality of gas filling ports in the event the temperature of an associated gas storage vessel exceeds a predetermined threshold.

According to a third aspect of the invention we provide a gas filling apparatus for filling a plurality of gas storage vessels with gas, the apparatus comprising a fill flow path configured to supply gas to the plurality of gas storage vessels, the fill flow path arranged to supply the gas storage vessels in series.

This is advantageous as this arrangement of a fill flow path that extends into and out of each of the gas storage vessels in turn provides a simple and effective way of filling a plurality of gas storage vessels. With this arrangement it is possible to use only one pressure controller for all of the vessels. Further, it allows the gas supplied by the apparatus to be used to control the temperature of the vessels.

The apparatus may include a plurality of bays, each bay configured to receive a gas storage vessel, and including a vessel inlet of the fill flow path for introducing gas into the vessel in the bay and a vessel outlet of the fill flow path for receiving gas that has passed through the vessel in the bay. Thus, the vessel outlet of a particular bay may be in fluid communication with the vessel inlet of an adjacent bay until the final bay.

The apparatus may be configured to flow gas through the plurality of vessels in series at predetermined pressures.

The apparatus may include a buffer tank for receiving the gas after it has passed through the plurality of vessels. The buffer tank may be configured and arranged to recycle the gas back into the fill flow path.

The apparatus may include a gas temperature management device configured to control the temperature of the gas in the fill flow path. The gas temperature management device may be configured to act on the fill flow path where it extends between the plurality of gas storage vessels. This is advantageous as any one of the connected gas storage vessels may generate heat when being activated or filled and the temperature control device is able to control the temperature at a plurality of points along the fill flow path.

The apparatus may include a controller configured to control the gas temperature management device based on the temperature of one or more of the gas storage vessels.

The apparatus may include a controller configured to control the pressure of the gas in the fill flow path based on the temperature of one or more of the gas storage vessels.

The fill flow path may include at least one filter. The fill flow path may include a filter downstream of each vessel outlet. This is advantageous as each gas storage vessel connected to the apparatus may have a different initial gas level and therefore the gas from one vessel may flow into downstream vessels. The provision of the filters prevents cross-contamination of the gas.

The apparatus may include a controller configured to independently control the supply of gas to the plurality of gas storage vessels in order to reduce or shut off the supply of gas to one or more of the gas storage vessels. The controller may be configured to maintain the supply of gas to the remaining ones of the plurality of gas storage vessels.

The controller may be configured to reduce or shut off the supply of gas to the one or more of the plurality of gas storage vessels in the event the temperature of that or those gas storage vessels exceeds a predetermined threshold. The controller may be configured to operate a bypass valve associated with a gas storage vessel in order to omit that gas storage vessel from the fill flow path or reduce the amount of hydrogen that flows through the gas storage vessel.

The apparatus may comprise a fuel cell charger filling apparatus.

According to a fourth aspect of the invention we provide a method of filling a plurality of gas storage vessels comprising;

placing the plurality of gas storage vessels in series in a fill flow path;

flowing a gas through the fill flow path and the plurality of gas storage vessels.

This is advantageous as a plurality of vessels can be filled simultaneously using the flowed gas. The flowing gas not only acts to fill the vessels but also assists in temperature control.

The method may include the step of controlling the temperature of the gas that is flowed through the one or more of the gas storage vessels to control the temperature of one or more of the vessels.

The method may include the step of controlling the pressure in the fill flow path based on the temperature of any one of the gas storage vessels.

The method may include the step of progressively increasing the pressure of the gas in the fill flow path. The method may include the step of pausing the increase of pressure if any one of the gas storage vessels exceeds a predetermined temperature. This may comprise maintaining a constant pressure or slowing the rate of increase of gas pressure or decreasing the gas pressure.

The step of flowing a gas may comprise circulating the gas through the fill flow path.

The method may include the step of independently controlling the supply of gas to the plurality of gas storage vessels in order to reduce or shut off the supply of gas to one or more of the gas storage vessels. The method may include maintaining the supply of gas to the remaining ones of the plurality of gas storage vessels. The method may include reducing or shutting off the supply of gas to the one or more of the plurality of gas storage vessels in the event the temperature of that or those gas storage vessels exceeds a predetermined threshold. The method may include operating a bypass valve associated with a gas storage vessel in order to omit that gas storage vessel from the fill flow path or reduce the amount of hydrogen that flows through the gas storage vessel.

According to a fifth aspect of the invention we provide a gas storage vessel including a gas storage material in a fill flow path, the gas storage material configured to absorb and store gas when exposed thereto, the fill flow path including a filling inlet for receiving gas and a filling outlet for expelling gas, the vessel, during a filling process, configured and arranged to receive a flow of gas through the fill flow path for absorption by the gas storage material.

This is advantageous as the gas storage vessel has an inlet and outlet for use during a filling process that allow the filling gas to be flowed through the vessel at pressure.

According to a sixth aspect of the invention we provide a gas filling apparatus for filling at least one gas storage vessel with a gas, the apparatus configured to flow the gas through the gas storage vessel during a filling operation to regulate the temperature of the gas storage vessel.

The apparatus may be configured to, during the filling operation, flow the gas through the at least one vessel at increasing pressures and/or flow the gas through the at least one vessel at a fixed or decreasing pressures. The features of the third aspect may be combined with this aspect.

According to a seventh aspect of the invention we provide a gas filling apparatus for filling a gas storage vessel with gas, the apparatus comprising a fuel cell power source configured to receive the gas as a fuel and provide electricity to one or more components of the gas filling apparatus.

The gas filling apparatus may further comprise a fill flow path configured to supply gas from a gas source to the gas storage vessel and a fuel cell flow path configured to supply gas from the gas source to the fuel cell. The fill flow path and the fuel cell flow path may be configured to supply gas simultaneously with each other.

The gas filling apparatus may comprise a hydrogen filling apparatus for filling fuel cell hydrogen storage vessels. The fuel cell may be a hydrogen fuel cell.

DRAWINGS

There now follows, by way of example only, a detailed description of embodiments of the invention with reference to the following figures, in which.

FURTHER DISCLOSURE

The examples described herein relate to an apparatus for introducing and storing a gas comprising a fuel in a gas storage vessel. In particular, the apparatus is used to store hydrogen fuel in a fuel storage vessel for use in a fuel cell system. The fuel storage vessels provide a hydrogen fuel source for a fuel cell that uses the hydrogen (and an oxidant such as oxygen from air) to generate electricity. However, it will be appreciated that the gas storage vessel could be used to store a gas or fuel for use in other systems.

Figure 1:
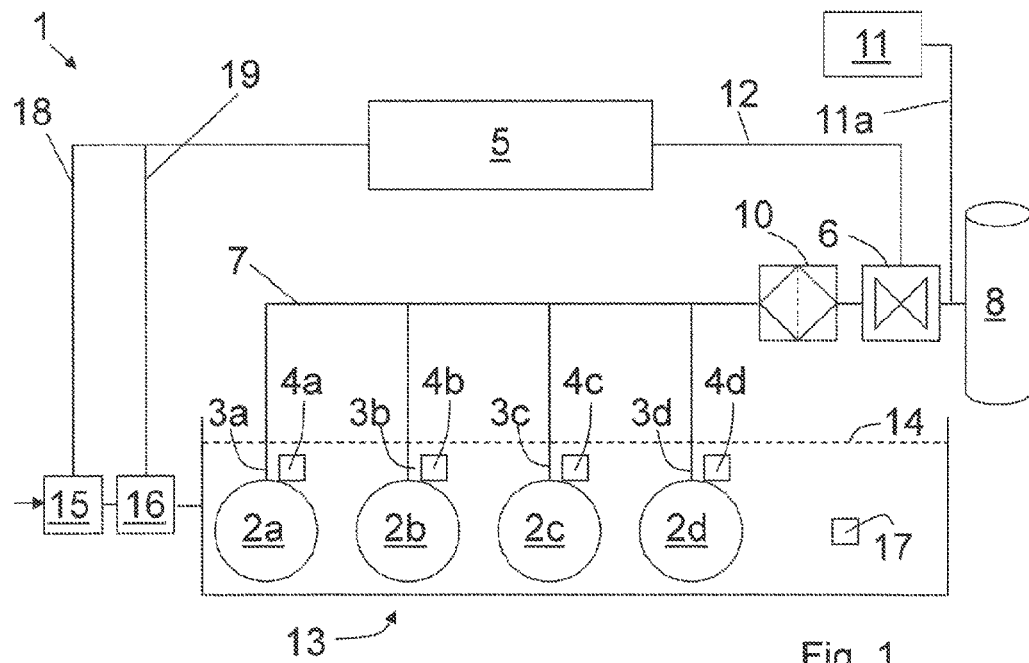
FIG. 1 shows an example of a gas filling apparatus.

FIG. 1 shows a gas filling apparatus 1 comprising a hydrogen filling apparatus. The apparatus 1 is configured to fill a plurality of gas storage vessels 2a-d simultaneously. The apparatus includes a plurality of filling ports 3a-d, each filling port 3a-d adapted to receive one of the gas storage vessels 2a-d. A plurality of sensors comprising temperature sensors 4a-d are arranged to measure the temperature of each of the gas storage vessels 2a-d. Thus, each sensor 4a-d is associated with a respective gas storage vessel 2a-d and in this embodiment is arranged to be in physical contact with a housing of the vessel. The apparatus includes a controller 5 configured to supply fuel to the filling ports 3a-d for filling the vessels 2a-d. The controller 5 is configured to control the supply of fuel using a pressure control device 6 to all of the ports 3a-d based on information from any one of the sensors 4a-d, as will be described in more detail below.

The storage vessels 2a-d contain a metal hydride fuel storage material. The metal hydride storage material is able to absorb gaseous hydrogen and chemically store it. Thus, the filling apparatus is configured to supply hydrogen to the storage vessels such that the hydrogen can be absorbed by the fuel storage material in the vessels 2a-d.

The filling ports 3a-d are supplied with hydrogen gas from a common manifold 7. The manifold 7 receives a supply of hydrogen gas from a hydrogen source 8 via the pressure control device 6. The manifold also includes a gas filter 10 for filtering the gas from the hydrogen source 8 which is located upstream of the filling ports 3a-d.

The filling ports 3a-d can be releasably coupled to the storage vessels 2a-d when they are placed in the apparatus for filling. Accordingly, the filling ports 3a-d include a connector for forming a connection to and forming a seal with their respective vessel 2a-d.

The temperature sensors 4a-d comprise thermocouples located adjacent the filling ports 3a-d such that when the storage vessels 2a-d are connected thereto, they can reliably measure the temperature of each storage vessel 2a-d. The sensors 4a-d provide measurement signals to the controller 5.

The pressure control device 6 controls the pressure of the hydrogen gas in the manifold and therefore the pressure that is presented to the plurality of storage vessels 2a-d. The pressure control device may include a pressure control valve to regulate and control the pressure of the gas received from the gas source. Alternatively or in addition, the pressure control device 6 may include a pump or compressor to pressurize the hydrogen for introduction into the manifold 7. The pressure control device 6 is controlled by the controller 5 via a control line 12.

The apparatus 1 includes a temperature regulation device 13 comprising a water bath. The storage vessels 2a-d are arranged to be submerged in the water bath. The water bath includes water (to level 14) as a temperature control medium, which is flowed through the water bath for maintaining the temperature of the storage vessels 2a-d. A pump 15 is provided to pump the water through the water bath 13. A heater/chiller 16 may be provided to heat or cool the water in the water bath to maintain a predetermined temperature. A water bath temperature sensor 17 is provided in the water bath, connected to the controller 5, to enable the control of the pump 15 and/or heater/chiller 16 via control lines 18, 19, to regulate the temperature of the water bath. In this example, the water bath is maintained at a temperature of substantially 20° C. It will be appreciated that other temperature regulation devices may be used such as jackets to fit around the vessels or blowers to drive heated or cooled air over the vessels.

When the storage vessels 2a-d are connected to the filling apparatus, they may have different levels of hydrogen therein. For example, some of the storage vessels may have been completely exhausted of fuel while others may hardly have been used. The absorption of hydrogen by the metal hydride is an exothermic process. The faster the rate of absorption, the more exothermic the absorption reaction is. Thus, during filling of the vessels 2a-d, heat is generated. The temperature of each of the vessels and therefore the metal hydride material therein affects the storage capacity of the fuel storage material. A higher hydrogen pressure is required to store an equivalent amount of hydrogen at a higher temperature compared to a lower temperature. The higher hydrogen pressure can be significantly higher for a relatively small change in temperature. Further, an empty vessel where the storage material contains little or no hydrogen will absorb hydrogen quicker than a fuller vessel. When simultaneously filling vessels, the emptier vessel will get hotter than a fuller vessel. Thus, it is important to control the filling process to obtain a plurality of storage vessels that are reliably and consistently filled to the same level.

Figure 2:
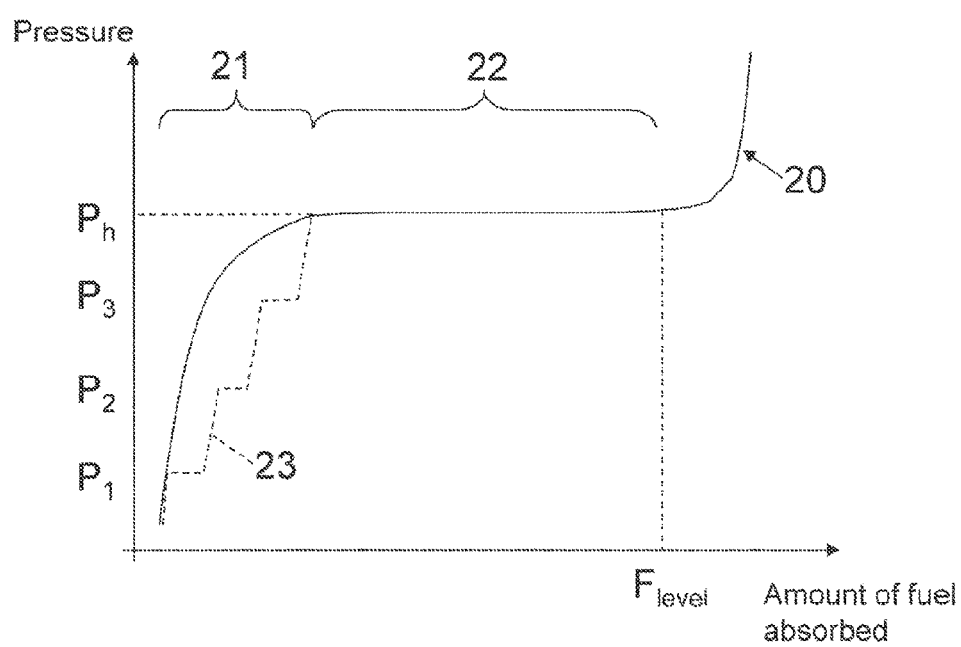
FIG. 2 is an example graph showing how the gas is absorbed into the gas storage vessels with changes in gas pressure.
Figure 3:
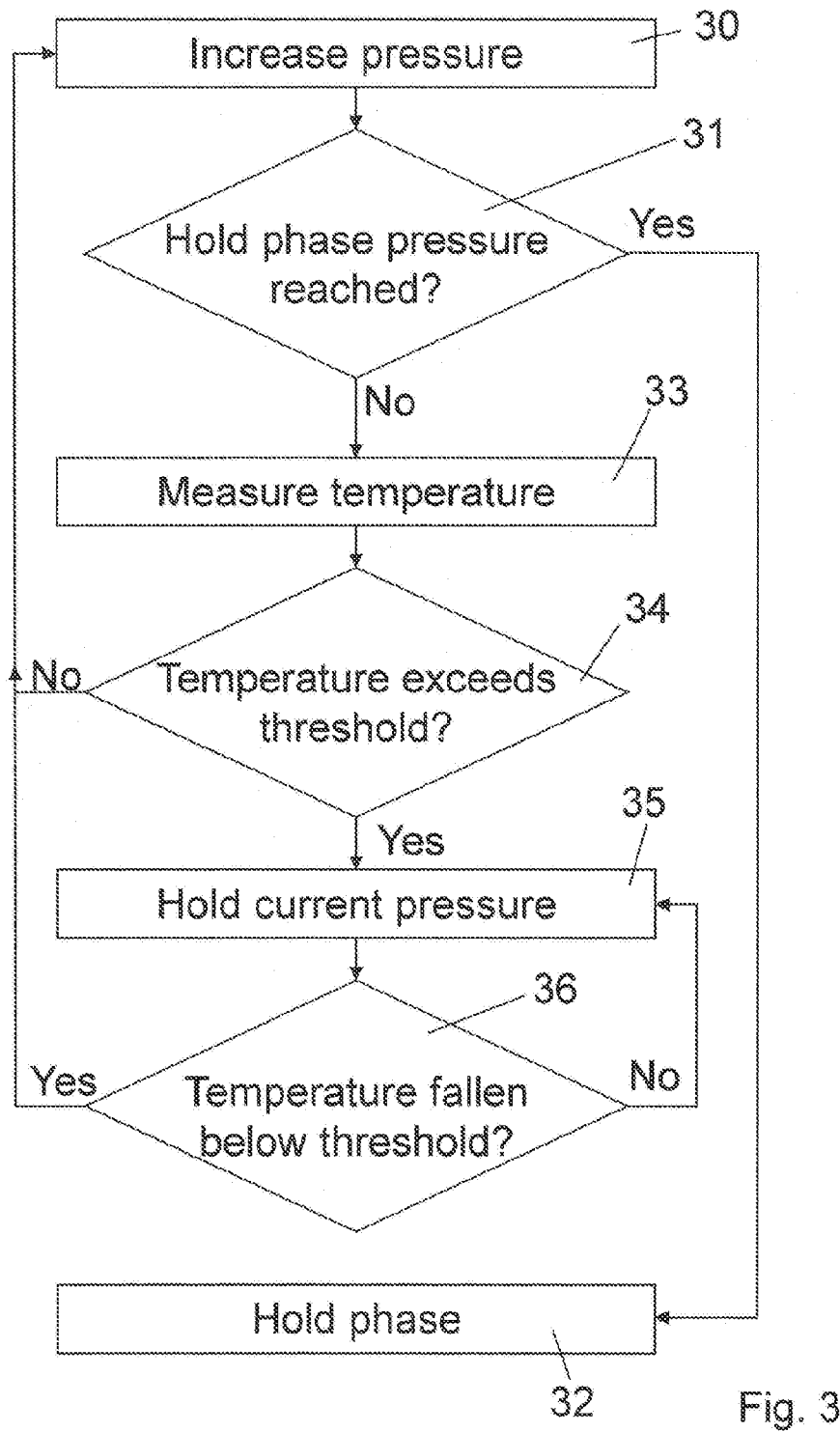
FIG. 3 shows a flow chart illustrating an example of how a controller of a gas filling apparatus may operate.

The filling apparatus may be configured to fill the storage vessels 2a-d in a two stage process. The first stage comprising an activation stage in which the hydrogen pressure in the vessels 2a-d is increased to a predetermined level and then reduced. This increase and decrease in hydrogen pressure may be repeated a plurality of times. In this example, three to five cycles of increasing and then decreasing the hydrogen pressure is provided. During the activation stage, the metal hydride adopts a more crystalline form in which it can absorb hydrogen more efficiently. The second stage comprises a fill stage, which is illustrated in FIGS. 2 and 3. It will be appreciated that the term "fill" and forms thereof is used herein to mean the introduction of gas into the gas storage vessels rather than filling the vessels to their full capacity.

In this example, the filling apparatus 1 is powered by a fuel cell power source 11. The fuel cell power source 11 is configured to receive as a fuel the same gas (in this example hydrogen) that is used to fill the gas storage vessels 2a-d and to provide electricity to one or more components of the gas filling apparatus 1. For example, one or more of the temperature sensors 4a-d, controller 5, pressure control device 6, pump 15, heater/chiller 16, water bath temperature sensor 17, and any other components of the filling apparatus 1 that require electricity, may be powered by the fuel cell power source 11. In some examples a battery may also be provided to start the fuel cell power source 11 operating.

It will be appreciated that in this example the apparatus 1 may be for filling a single storage vessel, and not necessarily a plurality of storage vessels 2a-2d as shown in FIG. 1.

The gas filling apparatus comprises a fill flow path for supplying hydrogen from the hydrogen source 8 to the storage vessel 2a-2d. The fill flow path may include the manifold 7 and any pipework or other conduits in fluid communication between the hydrogen source 8 and the storage vessels 2a-2d. Also provided is a fuel cell flow path 11a configured to supply hydrogen from the hydrogen source 8 to the fuel cell power source 11. The fill flow path and the fuel cell flow path 11a may supply hydrogen from the hydrogen source 8 simultaneously with each other.

Use of such a fuel cell power source 11 can be advantageous as the only fuel required for the apparatus 1 to carry out its function is hydrogen, a source of which is already present when the apparatus 1 is in use. Therefore, the apparatus 1 can be provided at a location that is remote and away from reliable conventional power sources.

FIG. 2 shows a graph illustrating the absorption of hydrogen by a metal hydride gas storage material. The x-axis shows the amount of hydrogen absorbed by the metal hydride. The y-axis shows the pressure at which the gaseous hydrogen is presented to the metal hydride to achieve a particular absorption quantity. It will also be appreciated that the rate at which hydrogen is absorbed by the metal hydride is related to the amount of hydrogen already absorbed by the metal hydride. Thus, the initial uptake of gaseous hydrogen when the fuel storage material has lower levels of absorbed hydrogen is greater than when the fuel storage material has higher levels of absorbed hydrogen. A curve 20 shows the absorption of hydrogen versus pressure at a constant temperature of 20° C. The curve 20 can be considered to comprise two parts: a ramp phase 21 and a hold phase 22.

The controller 5 may be programmed to operate in two phases that correspond to the ramp and hold phase, as explained below.

FIG. 3 shows a flow chart illustrating an example of the method followed by the controller 5 when simultaneously filling the storage vessels 2a-d. Step 30 shows the controller 5 controlling the pressure control device 6 to increase the hydrogen pressure supplied to the vessels 2a-d. In this example, the pressure is increased at a rate of 2.2 bar per minute, although other rates could be used as could incremental increases in pressure and non-linear increases in pressure. This increasing of the fuel pressure characterises the ramp phase. Step 31 shows the controller 5 determining whether a hold pressure, $P_{hold}$, has been reached. If the hold pressure has been reached, the controller 5 enters the hold phase, which is characterized by the hold pressure being maintained for a predetermined hold period, as represented by step 32. The hold period, in this example, comprises thirty to forty minutes.

The controller 5 monitors the temperature of each of the vessels 2a-d using the sensors 4a-d, as shown by step 33. The controller determines if the temperature of any one of the vessels 2a-d is above a threshold temperature at step 34. If the temperature of all of the vessels is below the threshold temperature the controller continues to increase the fuel pressure as represented by the method returning to step 30. The threshold temperature in this embodiment comprises 30° C., which is 10° C. above the temperature of the water bath 13.

If the temperature of any one of the vessels 2a-d, for example vessel 2c, detected by sensor 4c increases above the threshold temperature the pressure at which pressure control device is currently set is held constant by the controller 5, as shown at step 35. With reference to FIG. 2, dashed plot 23 shows a filling profile obtained by the present method. Thus, the pressure is held at the level at which the temperature threshold was exceeded by vessel 2c, which is shown as pause pressure $P_1$. The pressure $P_1$ is supplied to all of the vessels 2a-d.

Step 36 shows the controller 5 determining if the temperature of vessel 2c (or any other vessel) has fallen below the threshold temperature by a predetermined amount. In this example, the controller 5 determines if the temperature as detected by sensor 4c has fallen below 27° C. Thus, the controller 5 maintains the pause pressure $P_1$ until the temperature of the vessel 2c is the predetermined amount of three degrees below the threshold temperature. Once the vessel 2c has cooled, the controller continues to increase the fuel pressure as represented by the method returning to step 30. The dashed plot 23 shows the continued increase of pressure following the plateau at the pause pressure $P_1$. The method then continues until the hold pressure $P_h$ is reached. As can be seen from FIG. 2, the threshold temperature was exceeded on two further occasions and the pressure was held at pause pressure $P_2$ and pause pressure $P_3$ while one of the storage vessels 2a-d cooled.

The hold pressure, $P_h$, comprises a pressure at which the metal hydride absorbs hydrogen relatively slowly with only a small increase in temperature. This is represented by the flat part of curve 20 over the hold period 22. As mentioned above, the hold period 22 comprises thirty to forty minutes over which time the pressure is held at the hold pressure. The amount of hydrogen absorbed by the metal hydride increases to a level $F_{level}$. Given that the absorption curve 20 predicts the quantity of hydrogen absorbed at a particular pressure and that the apparatus controls the pressure control device 6 to ensure each and every vessel is within a particular temperature range, the apparatus can achieve a consistent fill level for all vessels 2a-d. The apparatus and method is able to compensate for different initial fill amounts while filling the plurality of vessels simultaneously. Once the hold period 22 is completed, the vessels 2a-d can be removed from the apparatus 1 and reused.

In an alternative example, hydrogen flow to the individual gas filling ports 3a-2d may be independently controllable in order to reduce or shut off the flow of hydrogen to one or more of the associated storage vessels 2a-2d, whilst maintaining hydrogen flow to the remaining ones of the storage vessels 2a-2d. In one example, the plurality of filling ports 3a-d may be provided with this functionality. The controller 5 may be configured to determine which of the storage vessels 2a-2b has overheated in the same way as described above by comparing the temperatures returned by the temperature sensors 4a-4d with a threshold temperature. That is, the controller can reduce or shut off the supply of hydrogen to the one or more of the gas filling ports 3a-d in the event the temperature of an associated storage vessel 2a-d exceeds a predetermined threshold. The controller 5 can then reduce or shut off the hydrogen flow to the overheated storage vessel 2a-2d until the temperature of that storage vessel has dropped below the threshold temperature by a predetermined amount. This can assist with cooling the overheated storage vessels 2a-2d.

Figure 4:
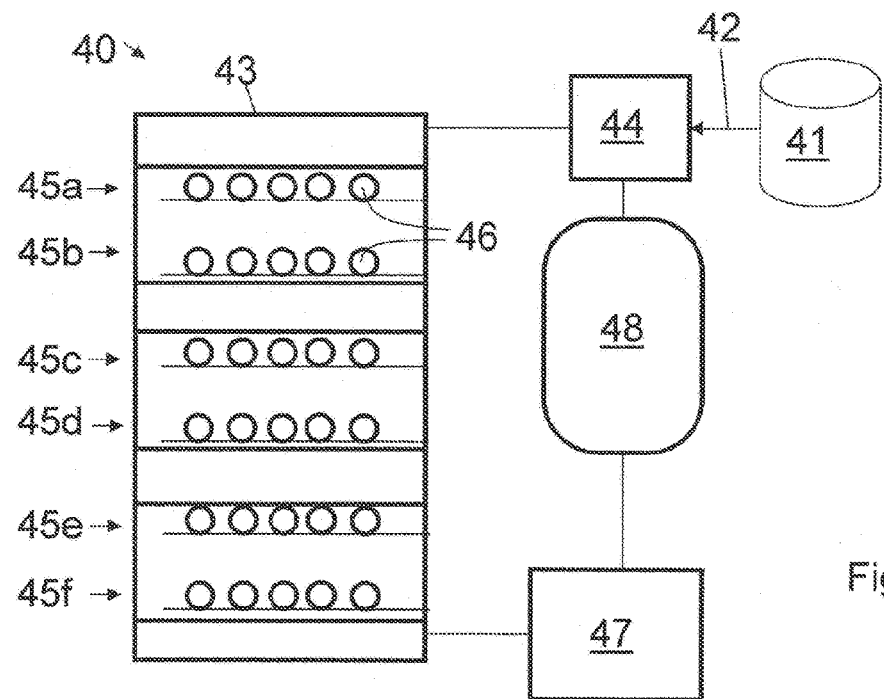
FIG. 4 shows a second example of a gas filling apparatus.

FIG. 4 shows a further example of a gas filling apparatus. The gas filling apparatus 40 comprises a hydrogen source 41 and a hydrogen supply conduit 42 that supplies hydrogen to a batch filling station 43. The hydrogen supply conduit includes one way valves and a control valve represented generally at 44. The batch filling station 43 contains rows 45a-f of filling bays. Five bays are provided per row, although any number of stations, rows or bays may be provided. Further, the bays may be arranged in any appropriate configuration. Each filling bay is configured to receive one gas storage vessel 46. The hydrogen from the hydrogen source 41 is moved through the apparatus by a circulation pump 47. The circulation pump 47 drives the hydrogen through the filling station 43 and into a buffer tank 48. From the buffer tank 48, the hydrogen can be recycled back into the hydrogen supply conduit 42 for recirculation through the filling station 43.

In a similar way to FIG. 1, any components of the filling apparatus 40 that require electricity may be powered by a fuel cell power source 66, which receives hydrogen as fuel from the hydrogen source 41.

Figure 5:
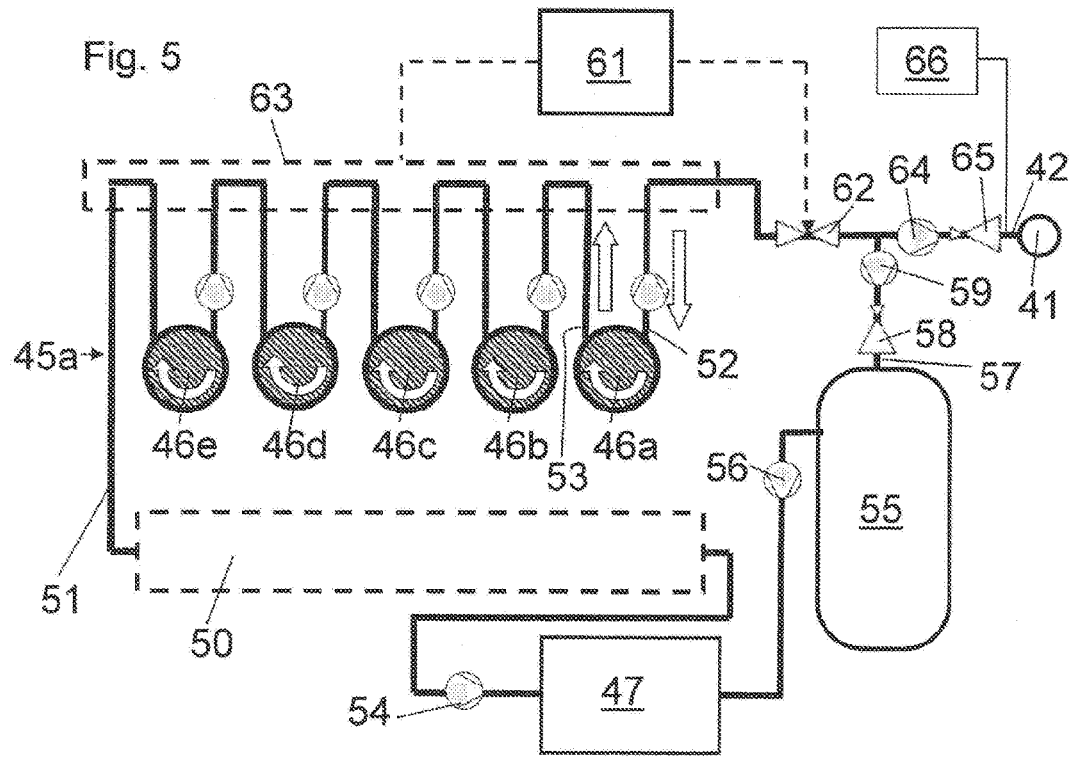
FIG. 5 shows a detailed view of one of the rows of the apparatus shown in FIG. 4.

FIG. 5 shows a more detailed view of the filling apparatus 40. The hydrogen supply conduit 42 includes a check valve 64 and a step down regulator 65. Only one row 45a of filling bays is shown with the remainder of the rows of bays represented by dashed box 50. The apparatus 40 includes a fill flow path 51 that receives hydrogen from the hydrogen supply conduit 42 and is configured to connect the gas storage vessels 46a-e together in series such that hydrogen entering the fill flow path 51 can flow through each of the gas storage vessels in turn as it moves along the fill flow path 51. Accordingly, the fill flow path includes a vessel inlet port 52 and a vessel outlet port 53 for each of the bays. A check valve is provided at each of the vessel inlet ports 52. When a gas storage vessel is loaded into a bay, the vessel inlet port 52 releasably connects to a corresponding vessel inlet 71 and the vessel outlet port 53 releasably connects to a corresponding vessel outlet 72. The gas storage vessel thus becomes part of the fill flow path 51 as hydrogen can flow into the inlet 71 and out of the outlet 72 and onto the gas storage vessel in the next bay. Once the fill flow path 51 has passed through each of the gas storage vessels in series there is provided a check valve 54 and a buffer tank 55 for receiving the hydrogen gas from the vessels 46 and the gas that has not been absorbed by the gas storage material in the vessels 46. The buffer tank 55 also includes a check valve 56 adjacent its inlet. The buffer tank 55 includes an outlet 57 including a step down regulator 58 and check valve 59 into the fill flow path 51. Thus, the fill flow path 51 comprises a loop and includes a circulation pump 47 for driving the hydrogen fuel around the loop. It will be appreciated that the hydrogen supplied to the fill flow path will be primarily received from hydrogen source 41 and that when sufficient hydrogen pressure has built up in buffer tank 55, hydrogen from the buffer tank will be recycled into the fill flow path 51.

A controller 61 is provided to control a pressure control valve 62 that regulates the hydrogen pressure in the fill flow path 51 and therefore supplied to the gas storage vessels 46. The hydrogen supply conduit 42 includes a pressure control regulator and a check valve. The controller also controls a temperature management device 63 which acts on the fill flow path 51. The temperature management device 63 comprises a heater and/or chiller configured to control the temperature of the hydrogen gas in the fill flow path 51 as it flows into (and out of) each of the gas storage vessels 46. Thus, the temperature of the gas storage vessels 46, while they are simultaneously filled, is controlled using the filling gas itself.

Figure 6:
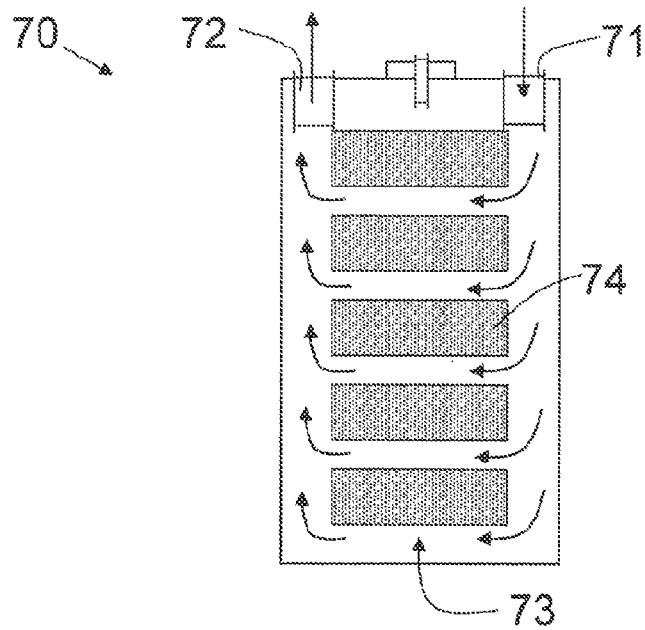
FIG. 6 shows an example diagram of a gas storage vessel for use with the apparatus of FIG. 4 and FIG. 5.

An example gas storage vessel is shown in FIG. 6. The gas storage vessel 70 includes the inlet 71 that opens into a gas storage region 73. The gas storage region 73 includes gas storage material 74, such as metal hydride, which is used to chemically store the hydrogen gas entering the inlet 71. Any unabsorbed hydrogen leaves the vessel 70 via the outlet 72.

The gas filling apparatus 40 follows a similar filling process to the previous example apparatus. Thus, the filling apparatus may be configured to fill the storage vessels 46 in a two stage process comprising an activation stage and a fill stage. Again, it will be appreciated that the term "fill" and forms thereof is used herein to mean the introduction of gas into the gas storage vessels rather than filling the vessels to their full capacity.

During the activation stage, the controller 61 opens valve 62 to increase the hydrogen pressure in the fill flow path 51. The circulation pump 47 moves the hydrogen through the vessels 46a through to 46e and onto the other rows 45b to 45f. The controller then closes valve 62 and the circulation pump acts to draw the hydrogen out of the vessels 46 and into the buffer tank 55. In this way, a pause period is a period of reducing pressure. This increase and decrease in hydrogen pressure may be repeated a plurality of times by the controller 61 over the activation stage. In this example, three to five cycles of increasing and then decreasing the hydrogen pressure is provided.

The fill stage first comprises a ramp phase in which the controller 61 controls the valve 62 to progressively increase the pressure in the fill flow path 51. The circulation pump 47 drives the hydrogen gas through the fill flow path 51 and therefore through each of the vessels 46 located in the fill flow path 51. A temperature sensor (not shown for clarity) is associated with each of the vessels 46 in the filling station 43. The temperature sensors may be configured and arranged to measure the temperature of the vessel 46 itself or the temperature of the hydrogen gas leaving the vessel 46 at the vessel outlet port 53. As the hydrogen gas is flowed through the vessel and passed the metal hydride, the temperature of the gas leaving the vessel provides an accurate indication of the build up of heat (due to the absorption of hydrogen) in the vessel 46. The controller 61 uses the temperature received from the temperature sensors to control the circulation pump 47 and/or temperature management device 63. Thus, if the controller 61 detects that any one of the vessels 46 (say vessel 46d) has a temperature above a threshold it may control the valve 62 to hold the current pressure constant for a pause period or reduce the pressure for a pause period. This gives the "overheating" vessel 46 time to cool by way of the hydrogen fuel circulating through the vessels and the temperature management device 63. Alternatively or in addition, the controller may (i) control the circulation pump to increase the flow rate through the fill flow path 51; and/or (ii) control the temperature management device 63 to reduce the temperature of the hydrogen in the fill flow path; and/or (iii) control the temperature management device 63 to reduce the temperature of the hydrogen entering the vessel that has exceeded the temperature threshold. Increasing the flow rate may act to cool the vessel due to the flow of hydrogen absorbing the heat as it flows through.

The controller 61 is configured to monitor the temperature and wait until the temperature of the particular vessel 46d has fallen below the threshold by a predetermined amount. In this example, the temperature management device 63 may act to maintain a hydrogen temperature of approximately 20° C. and the threshold temperature may be 23° C. Thus, the controller may wait until the vessel 46d is a predetermined amount, such as 2° C. below the threshold of 23° C., before controlling valve 62 such that the progressive increase in pressure is resumed. This process is repeated until a hold pressure is reached.

Once a predetermined hold pressure is reached, the controller 61 enters the hold phase in which the valve 62 is controlled to maintain a hold pressure in the fill flow path 51 for a predetermined hold period of time. When the hold period is complete, the vessels 46 are filled to the desired fill quantity and can be removed from the filling apparatus 40.

In some examples, the valves that are provided at each of the vessel inlet ports 52 and vessel outlet ports 53 may be bypass valves that can be operated in order to omit the associated storage vessel 46a-e from the fill flow path 51 or reduce the amount of hydrogen that flows through the associated storage vessel 46a-e. That is, instead of the hydrogen flowing into the inlet 71 and out of the outlet 72 of the associated gas storage vessel and on to the gas storage vessel in the next bay, the bypass valves can direct some or all of the hydrogen directly from the bypass valve at the inlet 71 to the bypass valve at the outlet 72 and on to the next gas storage vessel.

The controller 61 may be configured to control such bypass valves in order to independently control the supply of hydrogen to the plurality of storage vessels 46a-e in order to reduce or shut off the supply of hydrogen to one or more of the storage vessels 46a-e, whilst maintaining the supply of hydrogen to the remaining ones of the plurality of storage vessels 46a-e. The controller 61 may be configured to reduce or shut off the supply of hydrogen to the one or more of the plurality of storage vessels 46a-e in the event the temperature of the storage vessel 46a-e exceeds a predetermined threshold. For example, the controller 61 may determine which of the storage vessels 46a-e has overheated in the same way as described above by comparing the temperatures of the storage vessels 46a-e with a threshold temperature.

Figure 7:
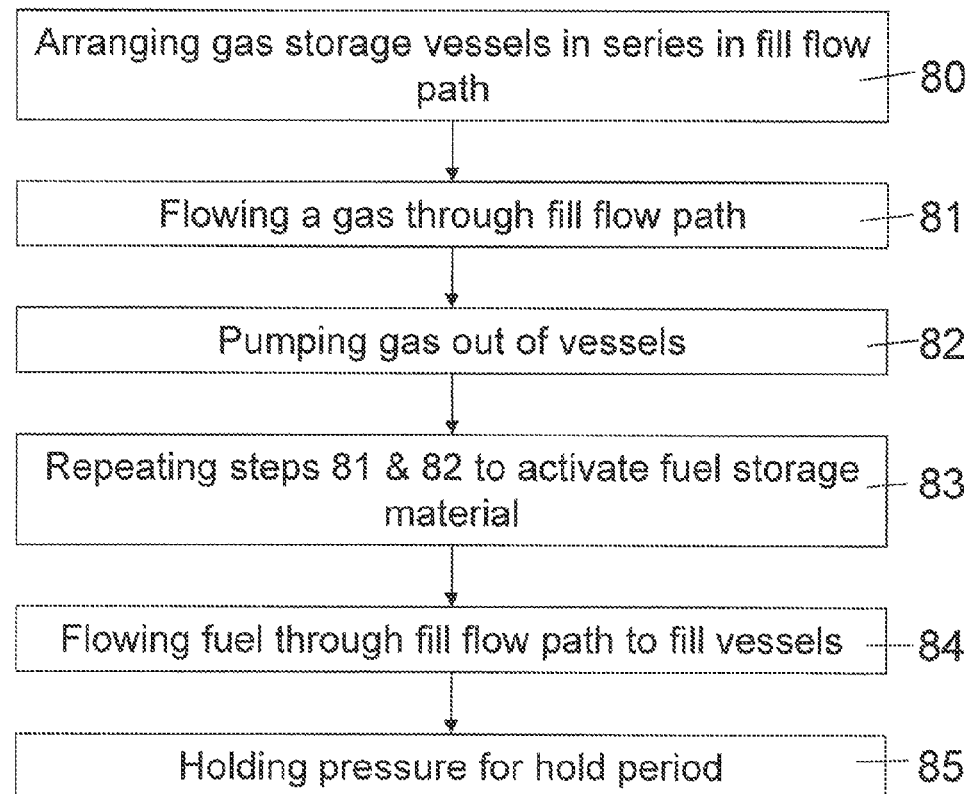
FIG. 7 shows a flow chart illustrating an example of how the filling apparatus of FIG. 4 may be operated.

FIG. 7 shows a flow chart illustrating the above method. Step 80 shows arranging the gas storage vessels in the bays in the filling station 43. The gas storage vessels 46 are connected together in series in the fill flow path. Step 81 shows the initiation of the activation stage in which the fill flow path is pressurised and gas is flowed through the fill flow path. Step 82 shows the step of reducing the pressure in the vessels 46 and the circulation pump acting to assist in drawing the gas from the vessels 46 into the buffer tank 55. Step 83 shows steps 81 and 82 being repeated to "activate" the gas storage material. Step 84 shows the initiation ramp phase of the fill stage in which the gas pressure in the fill flow path is increased over time, while temporarily pausing the pressure increase if any one of the vessels exceeds a predetermined temperature threshold. Step 85 shows the hold phase in which the hold pressure is maintained for a hold period to fill the vessels to a desired fill quantity.

It will be appreciated from the above description that in some examples the gas filling apparatus is configured to flow gas through at least one gas storage vessel during a filling operation to regulate the temperature of the gas storage vessel. This may involve flowing the gas through the at least one vessel at increasing pressures, as described above in order to achieve a hold pressure. Also, the gas filling apparatus can flow the gas through the at least one vessel at a fixed/stable or decreasing pressures, for example during pause periods when it is desired to lower the temperature of one or more of the storage vessels.

Although metal hydride is described as the gas storage material in the above examples, other gas storage materials could be used depending on the gas being stored in the gas storage vessels. Thus, the gas need not be hydrogen and could be any gas, fuel or otherwise. The controller described may comprise several separate controllers for controlling different parts of the apparatus. The controller may be an electronic or a mechanical device. For example, the temperature sensors may comprise bimetal strips that act on a pressure hold valve when the temperature exceeds a threshold value. The apparatus described herein may be powered by the gas it uses to fill the vessels. Thus, a fuel cell power source may be provided to use hydrogen as a fuel and to fill the vessels with hydrogen. This is advantageous as the apparatus may then only need to be supplied with hydrogen rather than an additional power supply.

The invention claimed is:

1. A gas filling apparatus for filling a plurality of gas storage vessels comprising metal hydride material with hydrogen gas, the apparatus comprising:
   a plurality of gas filling ports, each port configured to introduce hydrogen gas into one of the gas storage vessels, each gas filling port comprising one or more valves;
   a fill flow path comprising hydrogen gas and including the plurality of gas filling ports, the fill flow path further comprising a temperature management device, the temperature device comprising a heater, a chiller, or both configured to control the temperature of the hydrogen gas at a plurality of points in the fill flow path;
   wherein the fill flow path is configured to connect the plurality of gas storage vessels together in series, with the one or more valves of each gas filling port comprising a bypass valve configured to be operated to omit the associated gas storage vessel from the fill flow path or reduce the amount of hydrogen gas that flows through the associated gas storage vessel; and,
   a controller configured to supply hydrogen gas to the gas filling ports for filling the vessels and to control the supply of hydrogen gas to all of the gas filling ports or the operation of the temperature management device based on the rate at which hydrogen gas is absorbed into the metal hydride material of any one of the vessels wherein the controller is further configured to control the bypass valves of the gas filling ports independently.

2. A gas filling apparatus according to claim 1, in which the gas filling ports extend from a common manifold which is adapted to be supplied with hydrogen gas.

3. A gas filling apparatus according to claim 1, in which the apparatus includes a plurality of vessel sensors, each sensor configured to be associated with one of the gas storage vessels for determining the property of any one of the vessels.

4. A gas filling apparatus according to claim 3, in which each sensor is configured to measure the temperature of its associated vessel.

5. A gas filling apparatus according to claim 1, in which the controller is configured to progressively increase the pressure of the hydrogen gas supplied to the vessels.

6. A gas filling apparatus according to claim 5, in which the controller is configured to control the supply of hydrogen gas to the vessels in the event the temperature of any one of the plurality of vessels exceeds a predetermined threshold.

7. A gas filling apparatus according to claim 5, in which the controller, in the event the temperature of any one of the plurality of vessels exceeds a predetermined threshold, is configured to halt the progressive increase in hydrogen gas pressure supplied to the vessels for a pause period.

8. A gas filling apparatus according to claim 7, in which the controller is configured to resume progressively increasing the pressure after the pause period.

9. A gas filling apparatus according to claim 7, in which the pause period is determined by the time it takes for the vessel that exceeded the threshold to cool to a temperature below the threshold by a predetermined amount.

10. A gas filling apparatus according to claim 5, in which the controller is configured to progressively increase the pressure until a predetermined hold pressure is reached at which point the controller is configured to maintain the pressure for a hold period.

11. A gas filling apparatus according to claim 1, in which the apparatus includes a temperature regulation device for regulating the temperature of the vessels.

12. A gas filling apparatus according to claim 1, in which the controller is configured to supply hydrogen gas at a common pressure to each of the plurality of gas filling ports.

13. A gas filling apparatus according to claim 1, in which the controller is configured to independently control the supply of hydrogen gas to the plurality of gas filling ports in order to reduce or shut off the supply of hydrogen gas to one or more of the plurality of gas filling ports, whilst maintaining the supply of hydrogen gas to the remaining ones of the plurality of gas filling ports.

14. A gas filling apparatus according to claim 1, further comprising the controller configured to supply hydrogen gas to said gas storage vessels simultaneously.

15. The gas filling apparatus according to claim 1, further comprising a buffer tank fluidly connected to the fill flow path and configured to receive hydrogen gas from the fill flow path that has not been absorbed by the metal hydride material of the gas storage vessels.

16. The gas filling apparatus according to claim 1, further comprising at least one filter disposed between two of the plurality of gas storage vessels connected together in series.

17. The gas filling apparatus according to claim 1, wherein the temperature management device can control the temperature of the hydrogen gas in a region of the filling flow path extending between two of the plurality of gas storage vessels.

\* \* \* \* \*